(12) United States Patent
Wu

(10) Patent No.: US 10,107,379 B2
(45) Date of Patent: Oct. 23, 2018

(54) HOUSING FOR A GEAR UNIT AND GEAR UNIT HAVING A HOUSING

(71) Applicant: SEW-EURODRIVE GMBH & CO. KG, Bruchsal (DE)

(72) Inventor: Zili Wu, Tianjin (CN)

(73) Assignee: SEW-EURODRIVE GMBH & CO. KG, Bruchsal (DE)

(*) Notice: Subject to any disclaimer, the term of this patent is extended or adjusted under 35 U.S.C. 154(b) by 0 days.

(21) Appl. No.: 15/029,096

(22) PCT Filed: Oct. 20, 2014

(86) PCT No.: PCT/EP2014/002822
§ 371 (c)(1),
(2) Date: Apr. 13, 2016

(87) PCT Pub. No.: WO2015/067340
PCT Pub. Date: May 14, 2015

(65) Prior Publication Data
US 2016/0273643 A1   Sep. 22, 2016

(30) Foreign Application Priority Data

Nov. 8, 2013  (DE) .................. 10 2013 018 708

(51) Int. Cl.
*F16H 57/02* (2012.01)
*F16H 57/03* (2012.01)
(Continued)

(52) U.S. Cl.
CPC .......... *F16H 57/03* (2013.01); *F16H 57/021* (2013.01); *F16H 57/032* (2013.01);
(Continued)

(58) Field of Classification Search
CPC ...... F16H 57/03; F16H 57/021; F16H 57/032; F16H 2057/02073; F16H 2057/02091; F16H 2057/0216
See application file for complete search history.

(56) References Cited

U.S. PATENT DOCUMENTS 3,905,250 A * 9/1975 Sigg ................. B63H 23/12
                                          74/410
4,435,994 A * 3/1984 Hata ................ F16H 57/021
                                          74/606 R
(Continued)

FOREIGN PATENT DOCUMENTS

DE   10 2008 004 337   10/2008

OTHER PUBLICATIONS

International Preliminary Report on Patentability issued in PCT/EP2014/002822, dated May 30, 2016.
(Continued)

*Primary Examiner* — Vicky A Johnson
(74) *Attorney, Agent, or Firm* — Hunton Andrews Kurth LLP

(57) ABSTRACT

A housing for a gear unit and a gear unit having a housing, the housing having a housing top part and a housing bottom part, the housing top part having a frame-like support section on which wall sections are molded, the frame-like support section being formed in one piece, thus integrally, with the wall sections, particularly as a casting, especially as a steel casting.

31 Claims, 9 Drawing Sheets

(51) Int. Cl.
*F16H 57/021* (2012.01)
*F16H 57/032* (2012.01)

(52) U.S. Cl.
CPC .............. *F16H 2057/0216* (2013.01); *F16H 2057/02073* (2013.01); *F16H 2057/02091* (2013.01)

(56) References Cited

U.S. PATENT DOCUMENTS

| | | |
|---|---|---|
| 4,914,907 A | 4/1990 | Okada |
| 5,156,576 A | 10/1992 | Johnson |
| 7,810,412 B2 * | 10/2010 | Yamasaki ........... F16H 57/0006 464/180 |

OTHER PUBLICATIONS

International Search Report, dated Apr. 20, 2015, issued in corresponding International Application No. PCT/EP2014/002822.

* cited by examiner

HOUSING FOR A GEAR UNIT AND GEAR UNIT HAVING A HOUSING

FIELD OF THE INVENTION

The present invention relates to a housing for a gear unit and a gear unit having a housing.

BACKGROUND INFORMATION

It is generally known that a housing of a gear unit has bearing mountings in which the bearings for the shafts of the gear unit are able to be accommodated, and the related forces are dissipated.

SUMMARY OF THE INVENTION

An object of the present invention is therefore to protect the environment, particularly to conserve resources.

Features of the present invention with regard to the housing are that the housing is provided for a gear unit, the housing having a housing top part and a housing bottom part, the housing top part having a frame-like support section on which wall sections are molded, the frame-like support section being formed in one piece, thus integrally, with the wall sections, particularly as a casting, especially as a steel casting.

The advantage in this case is that only the support section must contain a lot of material, thus, also mass, but not the wall sections. Therefore, great forces are able to be transmitted, while saving on material.

In one advantageous embodiment, the greatest wall thickness of the wall sections is less than the greatest wall thickness of the support section. The advantage in this instance is that the wall sections are able to be implemented with thin wall thickness, making it possible to realize the housing while saving on material.

In one advantageous development, the frame-like support section of the housing top part has a first and a second transverse rib, in particular, the transverse ribs stretching mainly in the horizontal direction, thus, in particular, being extended further in the horizontal direction than in any direction transverse to it, the frame-like support section having two first ribs, the two first ribs being set apart from each other and in each case being joined to the first transverse rib, especially at two points set apart from each other, in particular, the first ribs stretching mainly in the vertical direction, thus, in particular, being extended further in the vertical direction than in any direction transverse to it, the two second ribs being set apart from each other and in each case being joined to the second transverse rib, especially at two points set apart from each other, in particular, the second ribs stretching mainly in the vertical direction, thus, in particular, being extended further in the vertical direction than in any direction transverse to it. This is advantageous because especially high stability is attainable, accompanied by little expenditure for material. The reason is that the frame-like support section has a rectangular shape, in which the rectangle is bent out of the plane of the rectangle at its two opposite sides, so that the bent areas are located essentially in further planes that are perpendicular to the plane, are set apart from each other, and are parallel to each other.

In one advantageous embodiment, each first rib and each second rib has a lifting eye at its end area facing away from the respective transverse rib. This is advantageous because the forces introduced into the housing during transport are introduced directly into the frame-like support section, and not into wall sections having thin wall thickness.

In one advantageous development, a first rib is joined at its end area to a bar, especially a support bar, that is joined at its other end to the end area of a second rib, the other rib being joined at its end area to a bar, especially a support bar, that in turn is joined at its other end to the end area of the other second rib, in particular, the two bars being disposed in parallel and set apart from each other. This is advantageous because high stability is attainable with the aid of the bracings.

In one advantageous refinement, a shaft of the gear unit is supported by a bearing in the housing, a first part of the bearing mounting being located in the housing top part and a second part of the bearing mounting being located in the housing bottom part, the first part of the bearing mounting being implemented as a thickened section, and being joined to that area of the transverse ribs at which the respective rib is also joined. The advantage in so doing is that an additional bracing of the frame-like support section is provided by the thickened areas.

In one advantageous development, a housing cover closes an opening in housing top part 1, the opening being surrounded by the frame-shaped support section, particularly with clearance, especially so that the frame-shaped support section does not directly contact the opening, but rather is set apart from the opening. The advantage in this case is that gear-unit parts are able to be inspected through the opening and maintenance work is able to be carried out. At the same time, no lubricating oil flows out from the gear unit either, since the opening is located on the upper side of the housing top part.

Features with regard to the gear unit are that it is provided with a housing, a shaft of the gear unit being supported by a bearing in the housing, a first part of the bearing mounting being located in the housing top part and a second part of the bearing mounting being located in the housing bottom part, the first part of the bearing mounting being implemented as a thickened section, and being joined to that area of the transverse ribs at which the respective rib is also joined.

This is advantageous because high torsional stiffness and high mechanical stability are attainable.

DETAILED DESCRIPTION

Figure 1:
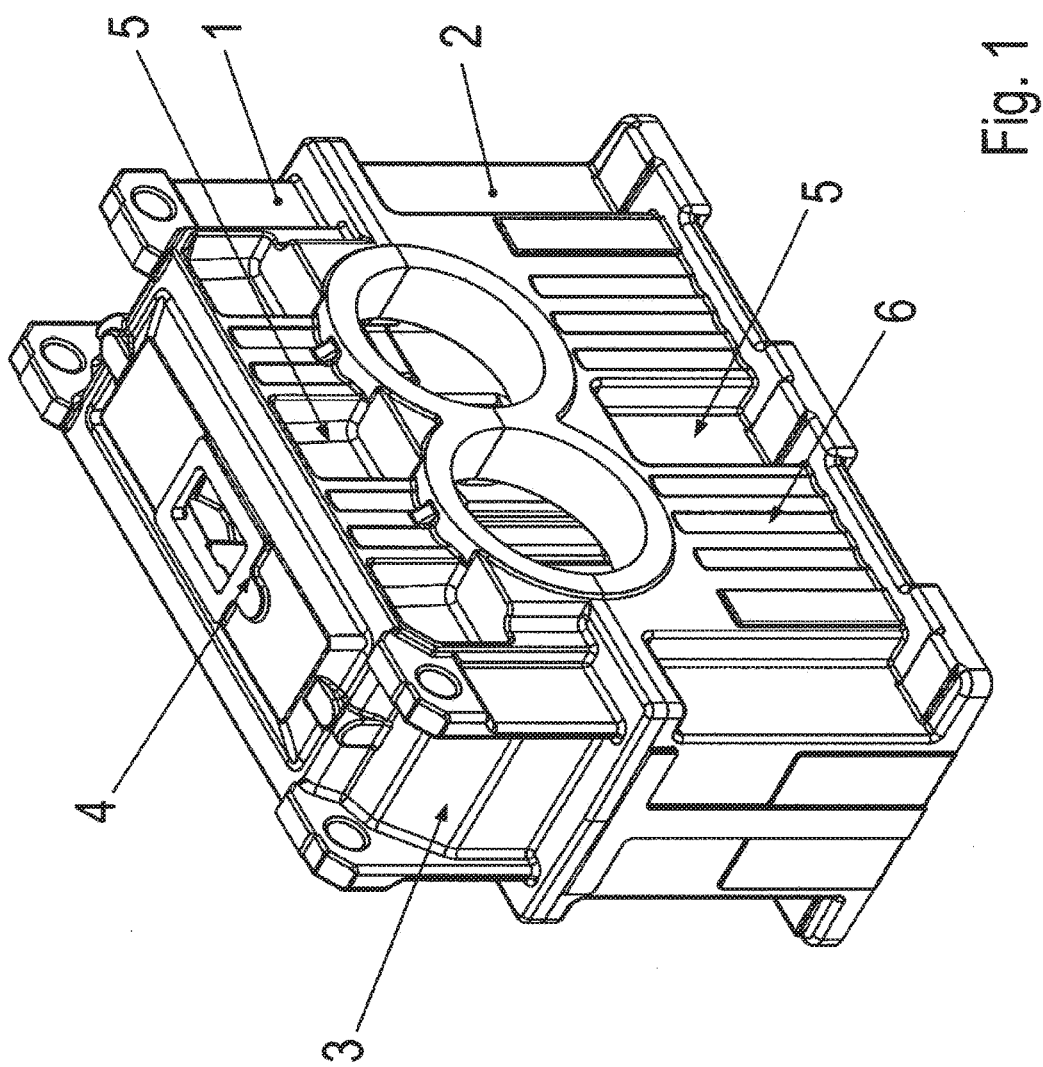
FIG. 1 shows an oblique view of a gear-unit housing according to the present invention for a gear unit in a first viewing direction, the housing being made up of a housing top part 1 and a housing bottom part 2.
Figure 2:
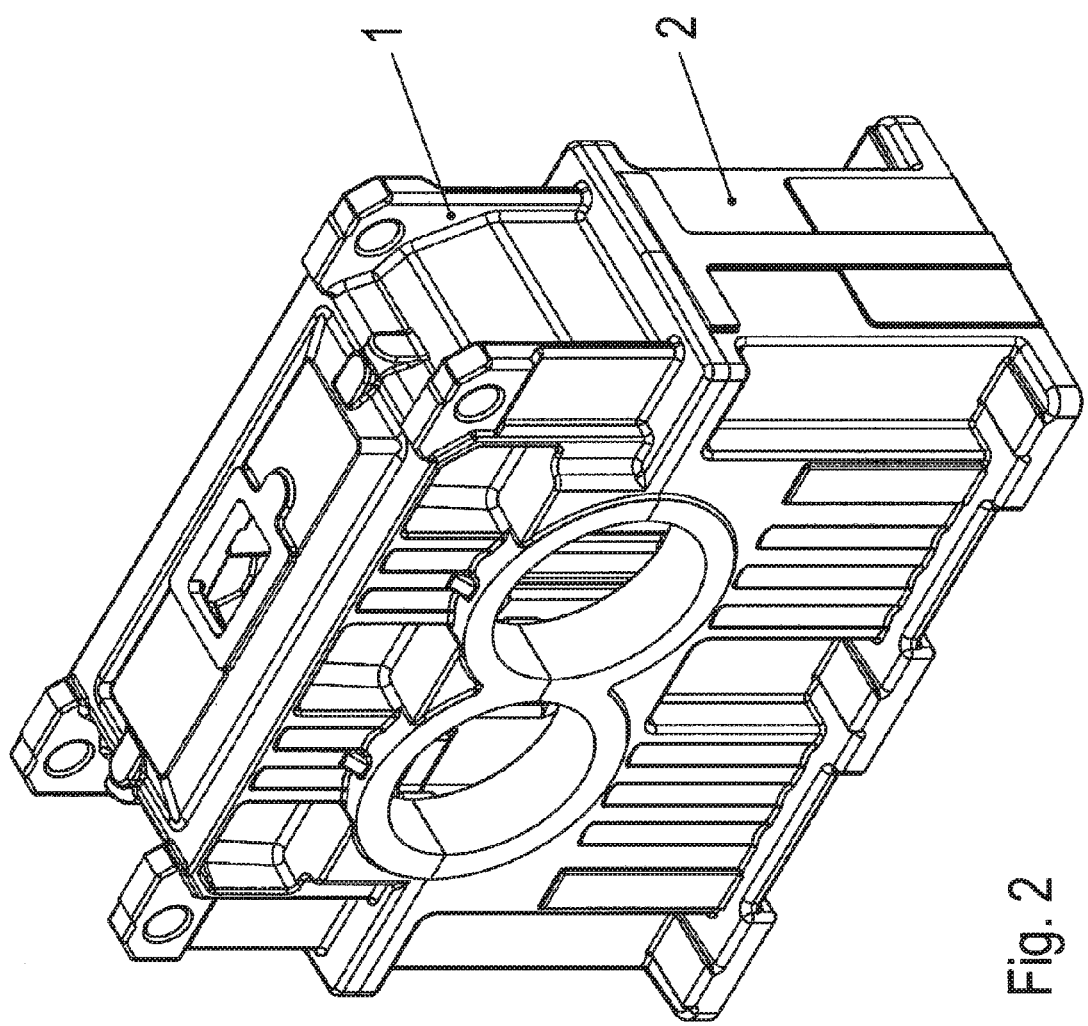
FIG. 2 shows an oblique view of the gear-unit housing according to the present invention in another viewing direction.
Figure 3:
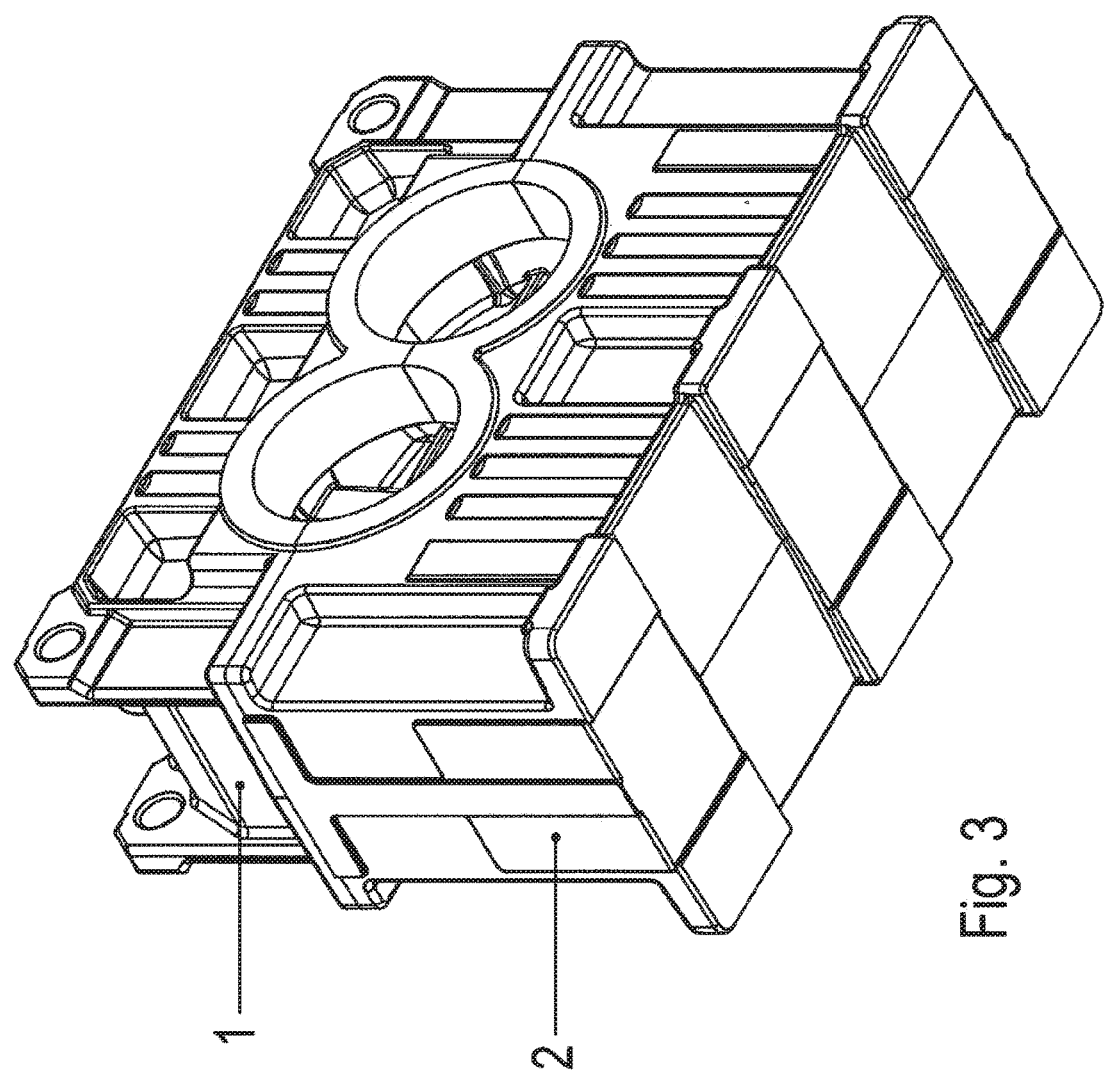
FIG. 3 shows an oblique view of the gear-unit housing according to the present invention in a third viewing direction.
Figure 4:
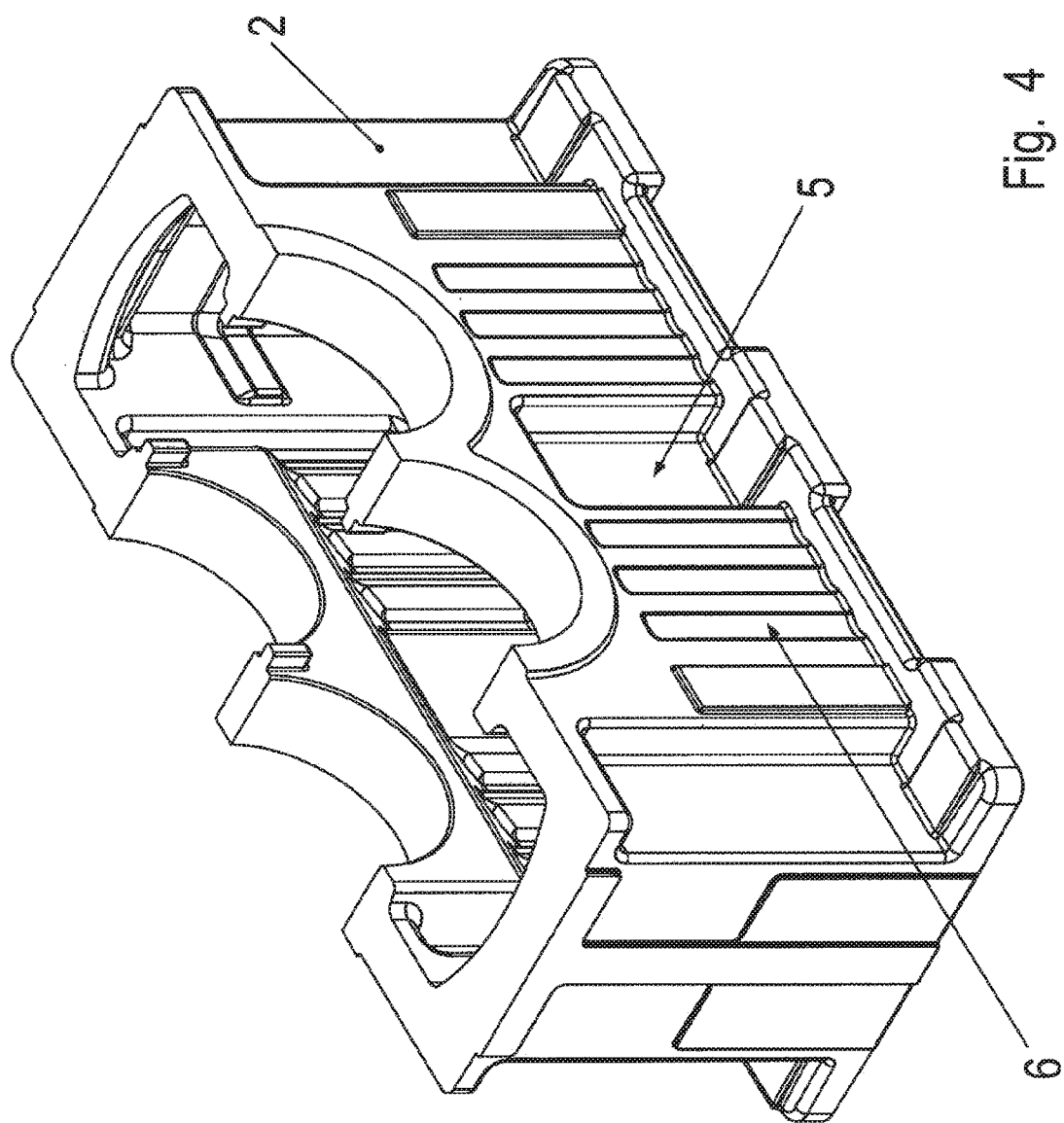
FIG. 4 shows an oblique view of housing bottom part 2.
Figure 5:
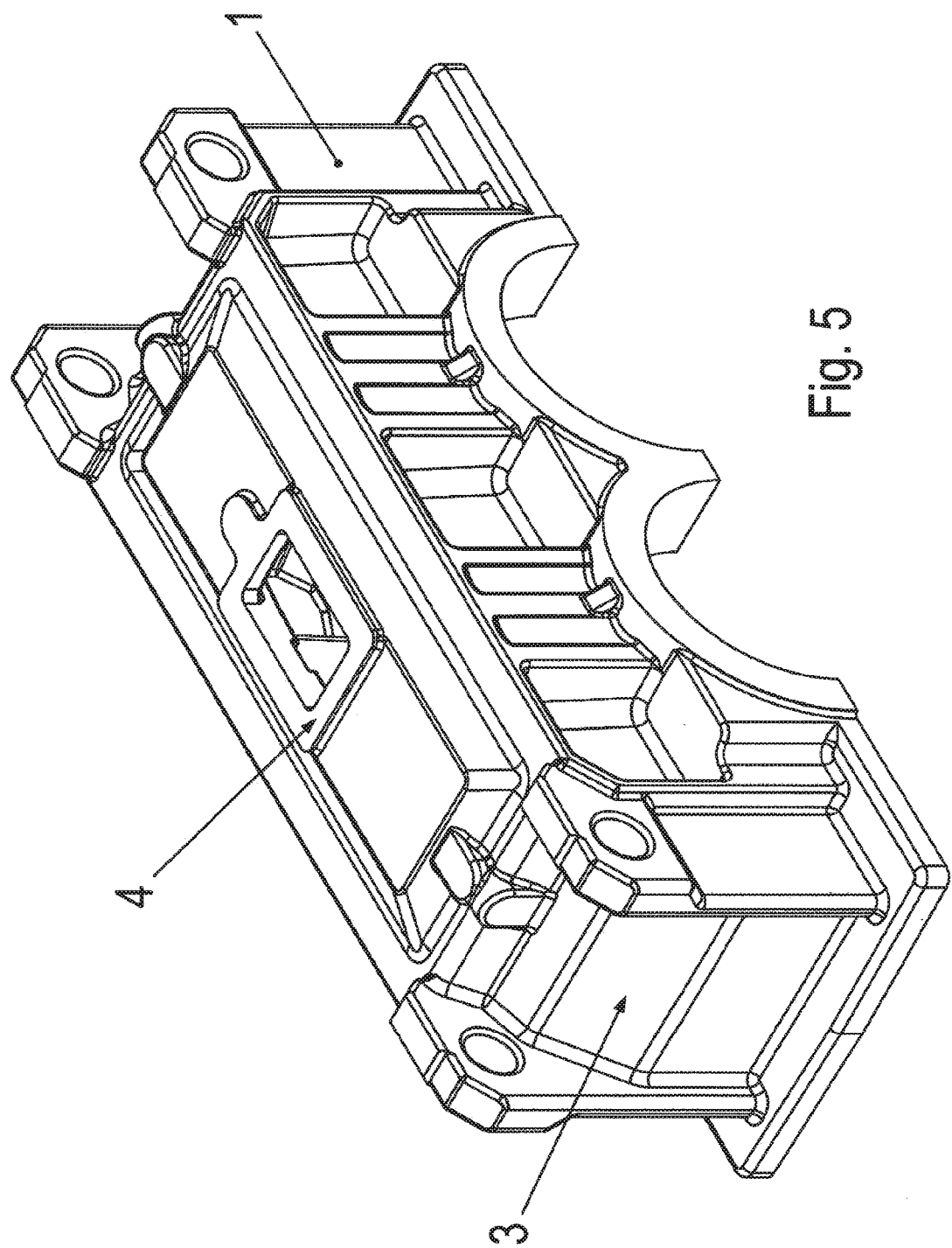
FIG. 5 shows an oblique view of housing top part 1.
Figure 6:
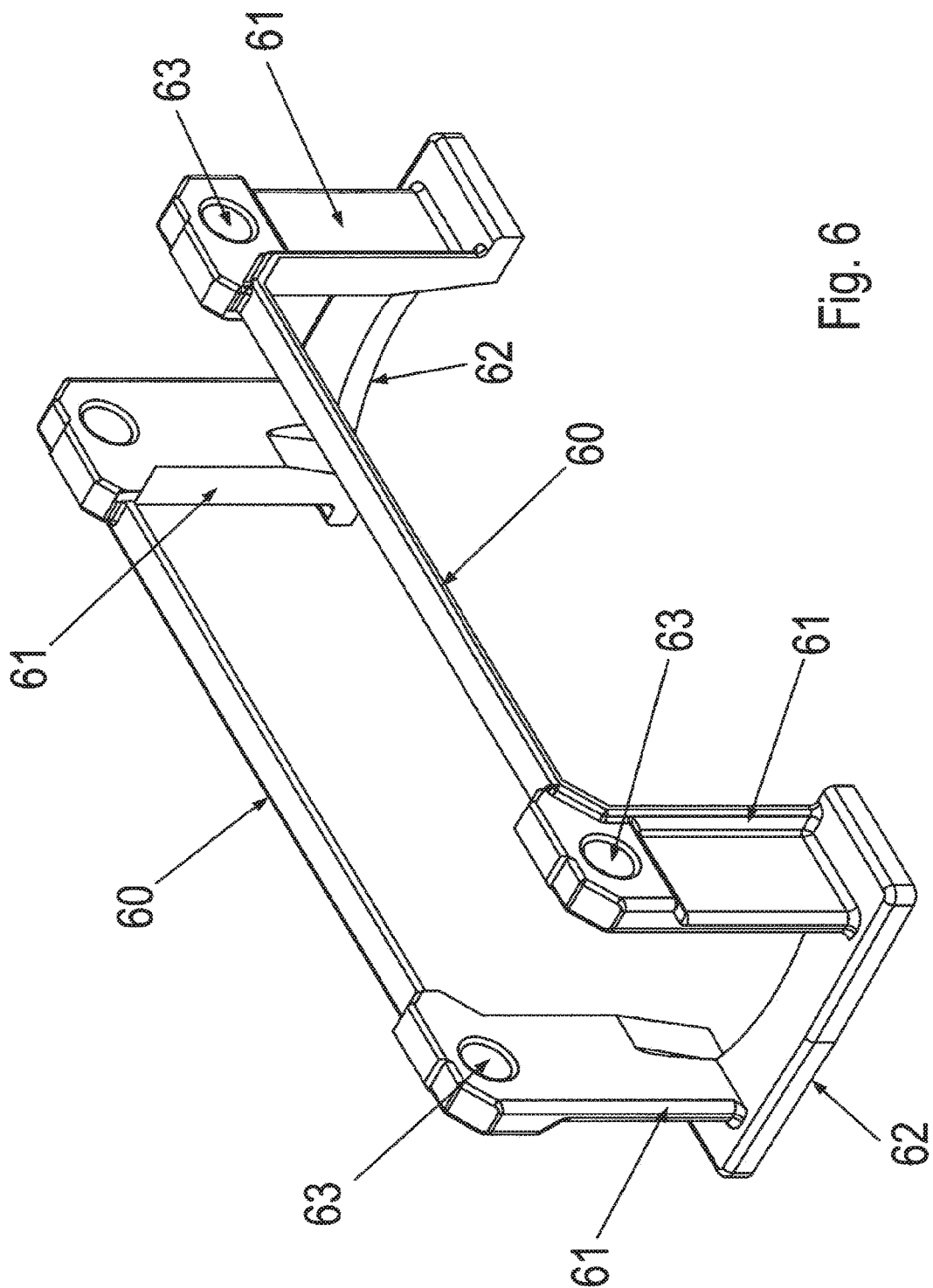
FIG. 6 shows the frame-like support section of housing top part 1.
Figure 7:
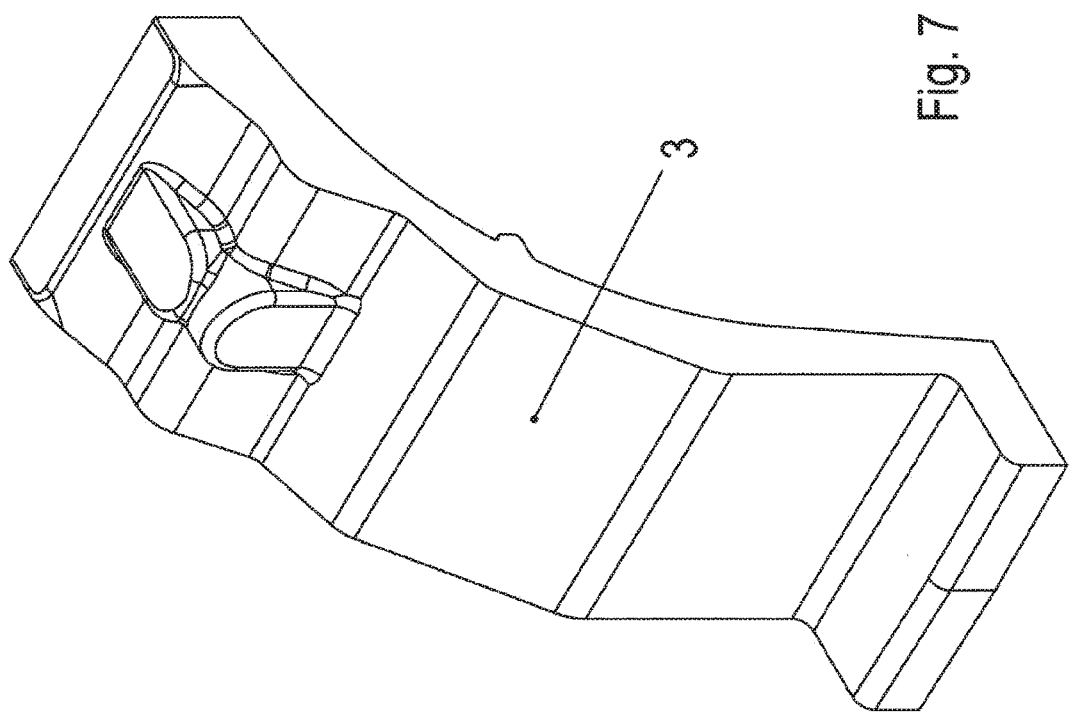
FIG. 7 shows a side wall section 3, which is inserted into the frame-like support section as segment from housing top part 1.
Figure 8:
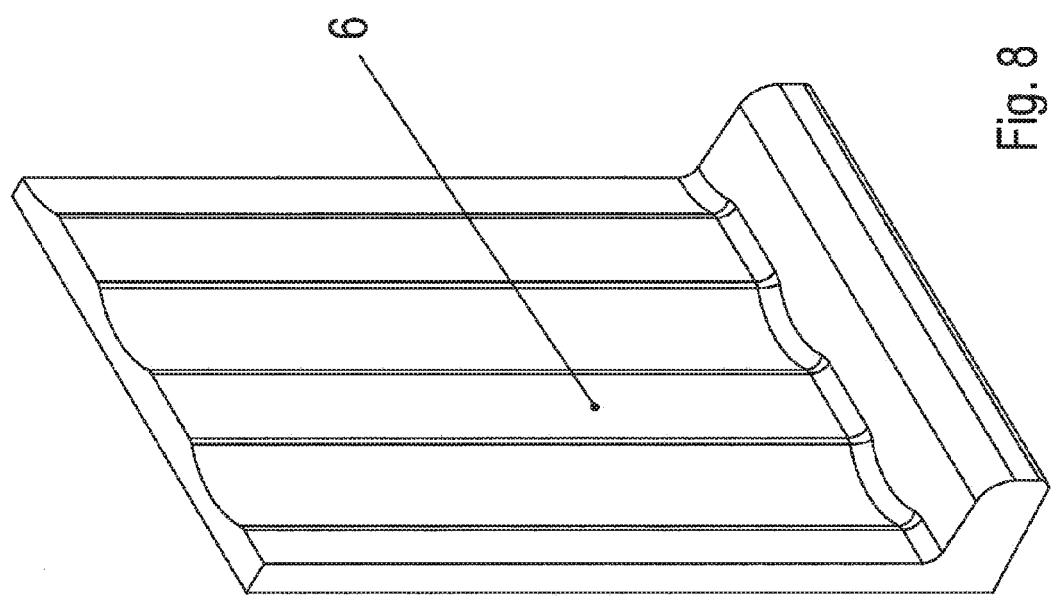
FIG. 8 shows a wall section having a wave structure, thus, especially a concave-convex wall section as segment from housing bottom part 2.

As shown in FIG. 1, housing bottom part 2 is disposed below housing top part 1. Thus, housing top part 1 is situated above housing bottom part 2 in the vertical direction.

Housing top part 1 has a frame-like support section, which takes up and conducts the major portion of the forces. The remaining sections of housing top part 1 are formed only for the oil-tight enclosure of the gear-unit interior, thus, are formed with thinner wall thickness than the support section and join closely to the support section.
Consequently, housing top part 1 as well as housing bottom part 2 are formed in shell-like fashion.

The frame-like support section of housing top part 1 has a first transverse rib 62. It extends mainly in the horizontal direction.

Two first ribs 61 are set apart from each other, and in each case are joined to first transverse rib 62, particularly at two points set apart from each other.

First ribs 61 stretch mainly in the vertical direction, thus, are extended further in the vertical direction than in any direction transverse to it.

The frame-like support section of housing top part 1 also has a second transverse rib 62. It extends mainly in the horizontal direction.

Two second ribs 61 are set apart from each other, and in each case are joined to second transverse rib 62, particularly at two points set apart from each other.

Second ribs 61 stretch mainly in the vertical direction, thus, are extended further in the vertical direction than in any direction transverse to it.

Each first rib 61 and each second rib 61 has a lifting eye 63 at its end area facing away from the respective transverse rib. Thus, the gear unit is able to be picked up at the lifting eyes by hooks or cable and is easily transportable. The forces occurring during transport are introduced at lifting eyes 63 into the end areas and thus into the frame-like support section.

Consequently, the gear-unit housing becomes only negligibly deformed and remains undamaged.

A first rib 61 is joined at its end area to a bar 60, particularly a support bar, which at its other end is joined to the end area of a second rib 61. In the same way, the other rib 61 is joined at its end area to a bar 60, particularly a support bar, that in turn is joined at its other end to the end area of the other second rib 61. The two bars 60 are disposed in parallel and set apart from each other.

As described above, wall sections are conformed to the frame-like support section—formed thus of ribs 61, transverse ribs 62 and bars 60—of housing top part 1, so that the shell-like housing top part is able to be formed in one piece, particularly as a casting.

In this connection, the wall sections, especially also two side wall sections 3 and the wall section having a concave-convex wave structure, are thus integrally molded and conformed to the frame-like support structure and implemented in one piece.

Bars 60 stretch mainly in the horizontal direction, thus, are extended further horizontally than in any direction transverse to that.

The frame-like support structure is thus realized by an increase in the wall thickness.

Figure 9:
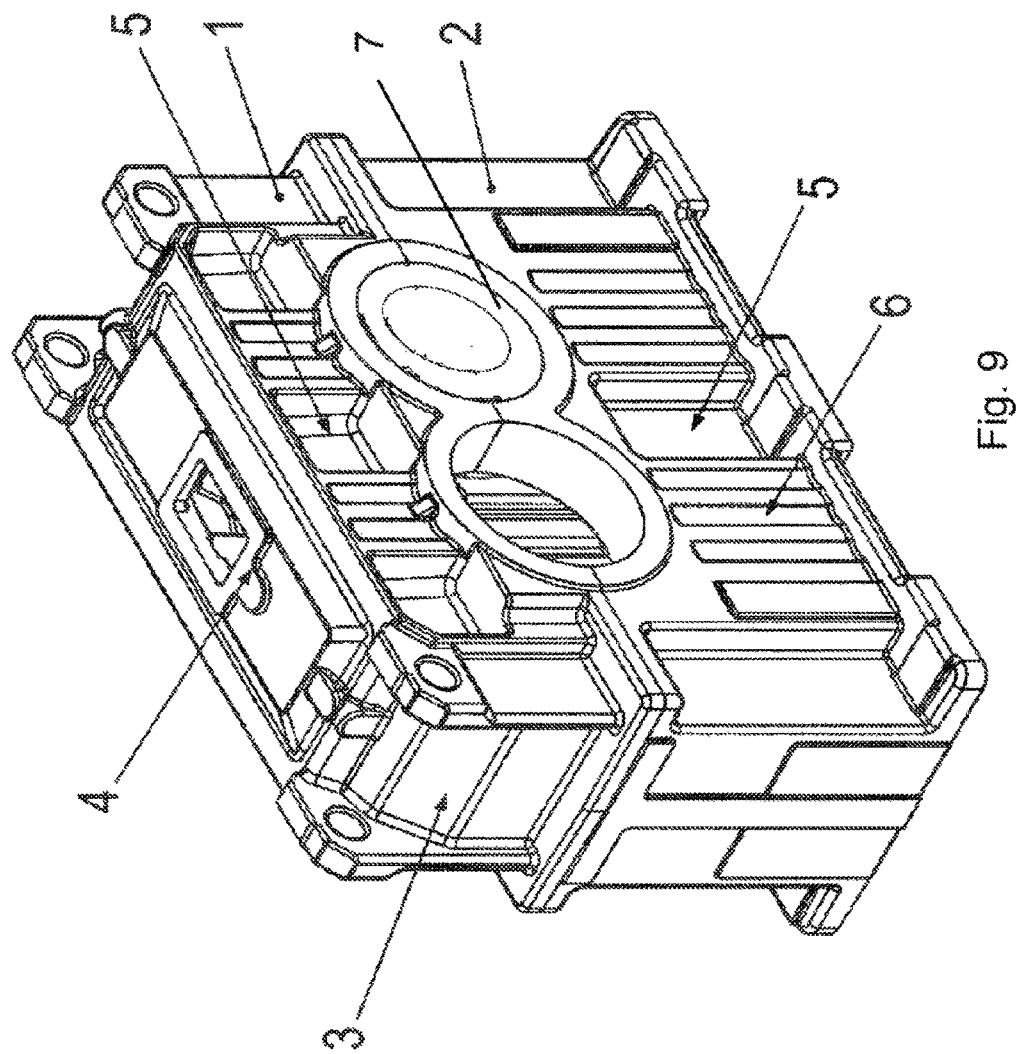
FIG. 9 shows an oblique view of a gear-unit housing according to the present invention for a gear unit in a first viewing direction, the housing being made up of a housig top part 1 and a housing bottom part 2, and the gear unit including a bearing 7.

In addition, thickened areas are also provided on housing top part 1, which are intended as bearing mounting for at least one part, especially half, of the circumference of an outer ring of a bearing 7 (see FIG. 9). These arch-like thickened areas adjoining one another are joined to transverse ribs 62, especially in each case in that end area in which respective rib 61 is joined.

The concave-convex wave structure of the wall sections enlarges the surface area, and therefore reduces resistance to the transfer of heat to the ambient air. In this context, an especially sharp depression is provided as depression 5 for a manipulation area for screw connections. In this case, the screws, not shown in the figures, are connecting screws by which housing top part 1 and housing bottom part 2 are screw-connected.

Housing bottom part 2 has a wave structure 6, particularly a concave-convex wall section, which likewise enlarges the surface area, and therefore reduces resistance to the transfer of heat from the gear-unit interior, especially lubricating oil, to the ambient air.

The housing cover is provided to close an opening in housing top part 1, the opening being surrounded by the frame-shaped support section, especially with clearance. That means that the frame-shaped support structure does not directly contact the opening, but rather is set apart from the opening.

LIST OF REFERENCE NUMERALS

1 housing top part
2 housing bottom part
3 side wall section
4 housing cover
5 depression for manipulation area for screw connections
6 wave structure, especially concave-convex wall section
60 bar
7 bearing
61 rib
62 transverse rib
63 lifting eye

What is claimed is:
1. A housing for a gear unit, comprising:
a housing top part; and
a housing bottom part, wherein:
the housing top part has a support section on which wall sections are molded,
the support section is formed in one piece, and integrally, with the wall sections,
the support section of the housing top part has a first transverse rib and a second transverse rib arranged substantially parallel to the first transverse rib,
the support section has two first ribs,
the two first ribs are set apart from each other, in each case are joined to and extend from the first transverse rib, and extend from the first transverse rib substantially parallel to each other,
the support section has two second ribs, and
the two second ribs are set apart from each other, in each case are joined to and extend from the second transverse rib, and extend from the second transverse rib substantially parallel to each other.
2. The housing as recited in claim 1, wherein the support section is formed in one piece, and integrally, with the wall sections as a casting.
3. The housing as recited in claim 2, wherein the casting is a steel casting.

4. The housing as recited in claim 1, wherein a greatest wall thickness of the wall sections is less than a greatest wall thickness of the support section.

5. The housing as recited in claim 1, wherein the first and second transverse ribs stretch mainly in a horizontal direction.

6. The housing as recited in claim 5, wherein the first and second transverse ribs extend further in the horizontal direction than in any direction transverse to the horizontal direction.

7. The housing as recited in claim 1, wherein the two first ribs are joined to the first transverse rib at two points set apart from each other.

8. The housing as recited in claim 1, wherein the first ribs stretch mainly in a vertical direction.

9. The housing as recited in claim 8, wherein the first ribs extend further in the vertical direction than in any direction transverse to the vertical direction.

10. The housing as recited in claim 1, wherein the two second ribs are joined to the second transverse rib at two points set apart from each other.

11. The housing as recited in claim 1, wherein the second ribs stretch mainly in a vertical direction.

12. The housing as recited in claim 11, wherein the second ribs extend further in the vertical direction than in any direction transverse to the vertical direction.

13. A housing for a gear unit, comprising:
a housing top part; and
a housing bottom part, wherein:
   the housing top part has a support section on which wall sections are molded,
   the support section is formed in one piece, and integrally, with the wall sections,
   the support section of the housing top part has a first transverse rib and a second transverse rib,
   the support section has two first ribs,
   the two first ribs are set apart from each other and in each case are joined to the first transverse rib,
   the support section has two second ribs,
   the two second ribs are set apart from each other and in each case are joined to the second transverse rib, and
   each first rib and each second rib has a lifting eye at an end area thereof facing away from a respective transverse rib.

14. A housing for a gear unit, comprising:
a housing top part;
a housing bottom part;
a first bar; and
a second bar, wherein:
   the housing top part has a support section on which wall sections are molded,
   the support section is formed in one piece, and integrally, with the wall sections,
   at least one of the first ribs is joined at an end area thereof to the first bar,
   the first bar is joined to an end area of at least one of the second ribs,
   another one of the first ribs is joined at an end area thereof to the second bar that in turn is joined to an end area of another one of the second ribs, and
   the first bar and the second bar are disposed in parallel and set apart from each other.

15. The housing as recited in claim 14, wherein:
the first bar is a first support bar,
the second bar is a second support bar.

16. A housing for a gear unit, comprising:
a housing top part;
a housing bottom part; and
a housing cover for closing an opening in the housing top part, wherein:
   the housing top part has a support section on which wall sections are molded,
   the support section is formed in one piece, and integrally, with the wall sections, and
   the opening is surrounded by the support section with clearance so that the support section does not directly contact the opening, and is set apart from the opening.

17. A gear unit, comprising:
a housing that includes:
   a bearing on a bearing mounting,
   a housing top part, and
   a housing bottom part, wherein:
      the housing top part has a support section on which wall sections are molded,
      the support section is formed in one piece, and integrally, with the wall sections,
      the support section of the housing top part has a first transverse rib and a second transverse rib arranged substantially parallel to the first transverse rib,
      the support section has two first ribs,
      the two first ribs are set apart from each other, in each case are joined to and extend from the first transverse rib, and extend from the first transverse rib substantially parallel to each other,
      the support section has two second ribs, and
      the two second ribs are set apart from each other, in each case are joined to and extend from the second transverse rib, and extend from the second transverse rib substantially parallel to each other; and
a shaft supported by the bearing in the housing, wherein:
   a first part of the bearing mounting is located in the housing top part, and
   a second part of the bearing mounting is located in the housing bottom part, and
   the first part of the bearing mounting is implemented as a thickened section and is joined to that area of a transverse ribs at which a respective rib is also joined.

18. The gear unit as recited in claim 17, wherein the support section is formed in one piece, and integrally, with the wall sections as a casting and/or as a steel casting.

19. The gear unit as recited in claim 17, wherein a greatest wall thickness of the wall sections is less than a greatest wall thickness of the support section.

20. The gear unit as recited in claim 17, wherein the first and second transverse ribs stretch mainly in a horizontal direction.

21. The gear unit as recited in claim 20, wherein the first and second transverse ribs extend further in the horizontal direction than in any direction transverse to the horizontal direction.

22. The gear unit as recited in claim 17, wherein the two first ribs are joined to the first transverse rib at two points set apart from each other.

23. The gear unit as recited in claim 17, wherein the first ribs stretch mainly in a vertical direction.

24. The gear unit as recited in claim 23, wherein the first ribs extend further in the vertical direction than in any direction transverse to the vertical direction.

25. The gear unit as recited in claim 17, wherein the two second ribs are joined to the second transverse rib at two points set apart from each other.

26. The gear unit as recited in claim 17, wherein the second ribs stretch mainly in a vertical direction.

27. The gear unit as recited in claim 26, wherein the second ribs extend further in the vertical direction than in any direction transverse to the vertical direction.

28. The gear unit as recited in claim 17, wherein each first rib and each second rib has a lifting eye at an end area thereof facing away from a respective transverse rib.

29. The gear unit as recited in claim 17, wherein the housing includes:
   a first bar; and
   a second bar, wherein:
      at least one of the first ribs is joined at an end area thereof to the first bar,
      the first bar is joined to an end area of at least one of the second ribs,
      another one of the first ribs is joined at an end area thereof to the second bar that in turn is joined to an end area of another one of the second ribs, and
      the first bar and the second bar are disposed in parallel and set apart from each other.

30. The gear unit as recited in claim 29, wherein:
the first bar is a first support bar,
the second bar is a second support bar.

31. The gear unit as recited in claim 17, wherein:
the housing includes a housing cover for closing an opening in the housing top part, and
the opening is surrounded by the support section with clearance so that the support section does not directly contact the opening, and is set apart from the opening.

* * * * *